INVENTOR
*Norman H. Hackett*

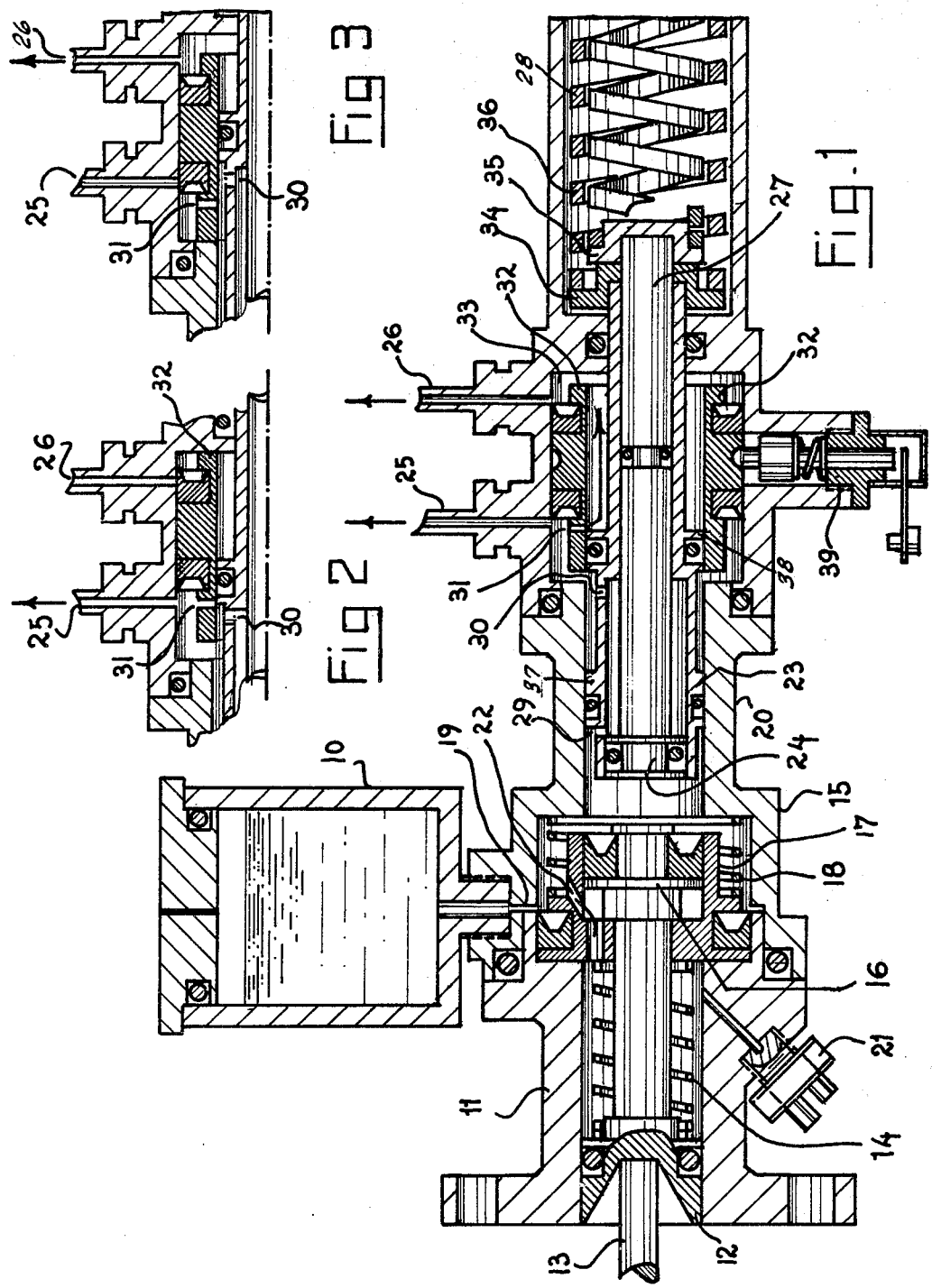

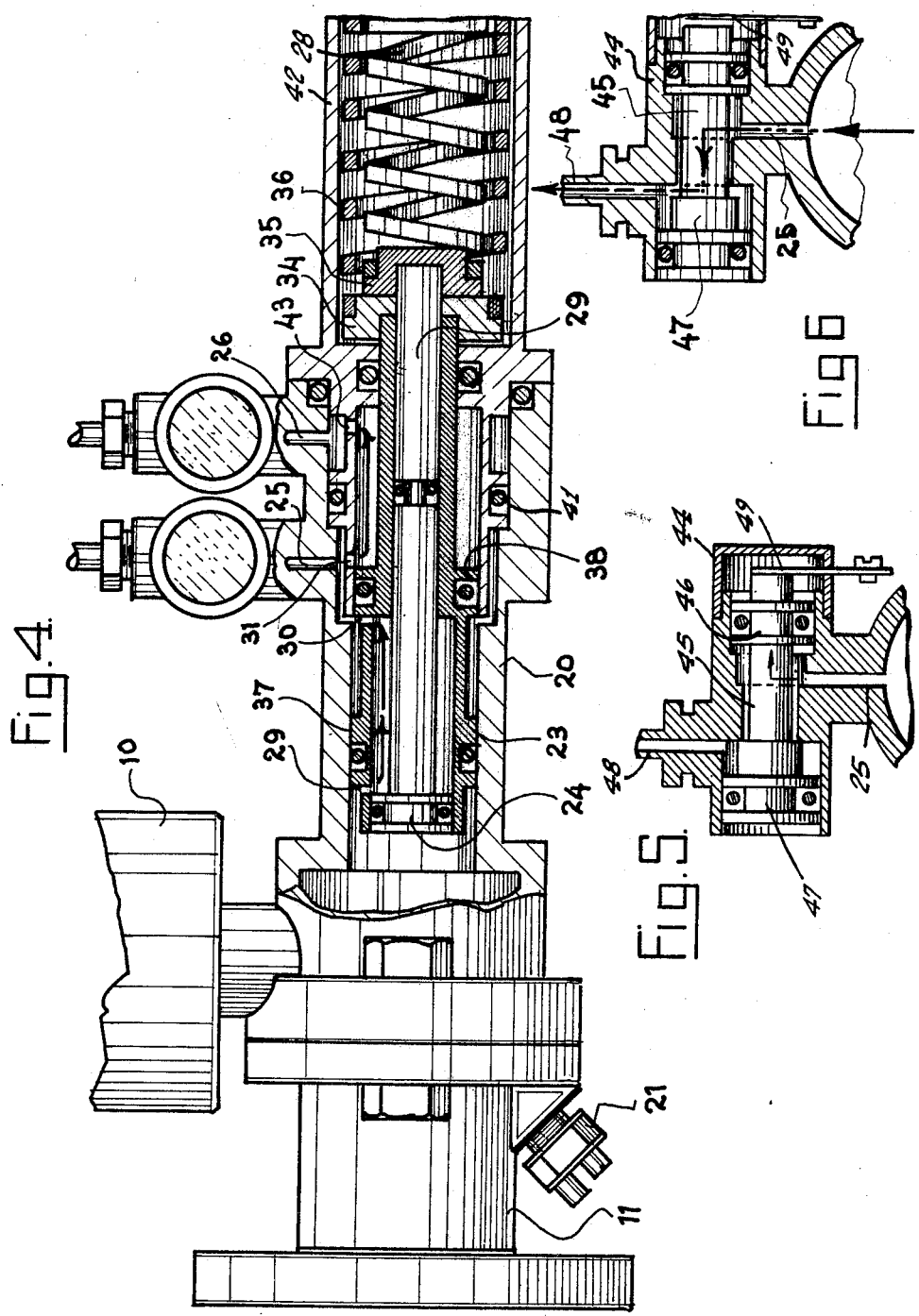

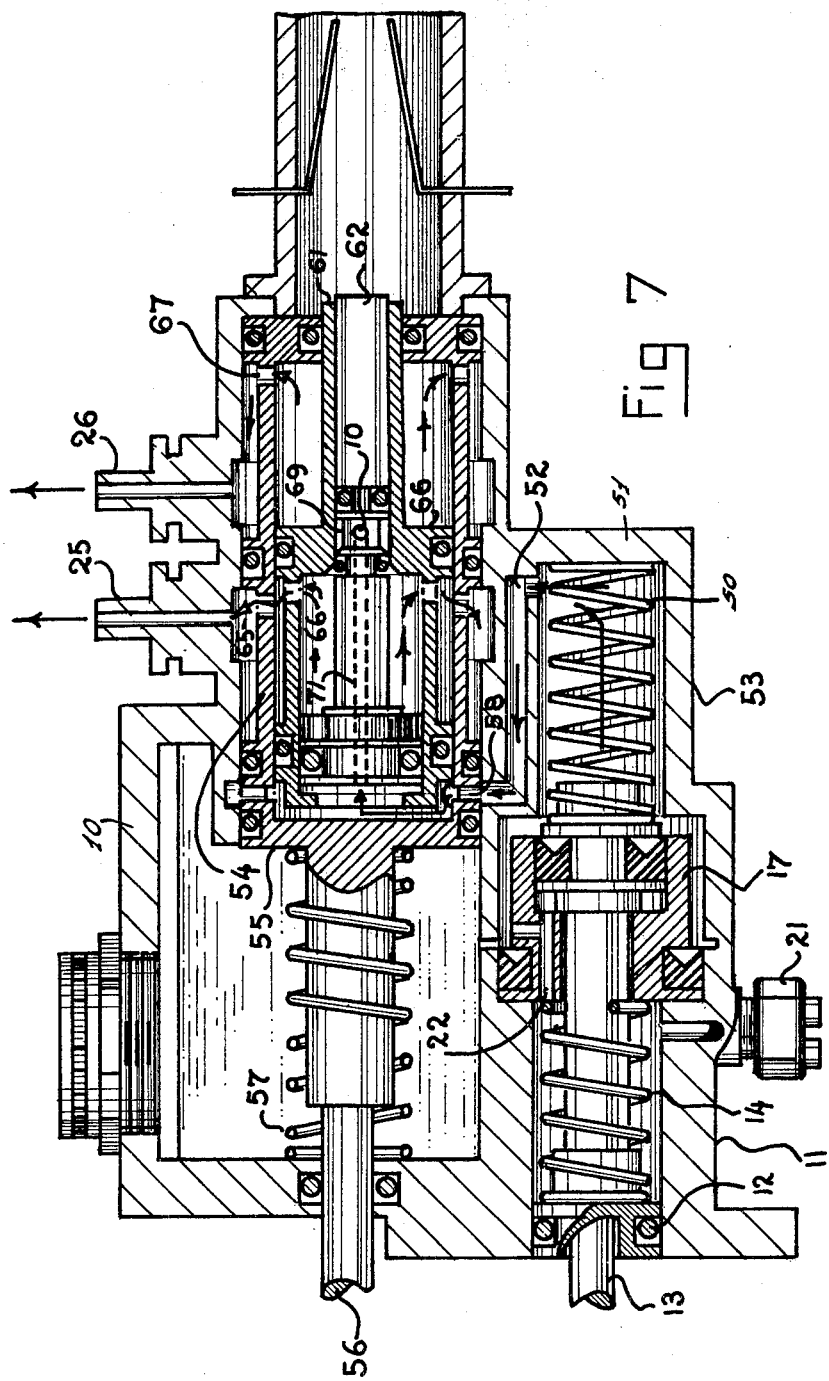

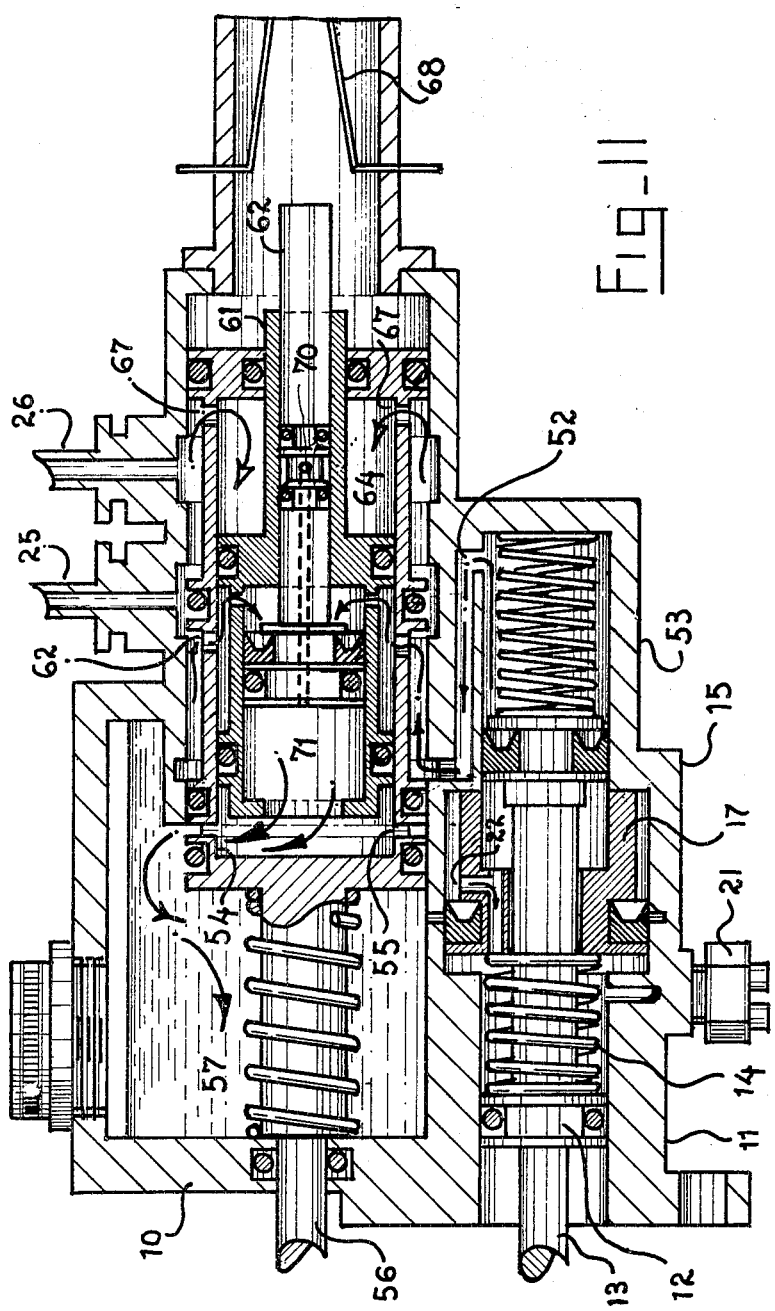

United States Patent Office 3,501,915
Patented Mar. 24, 1970

3,501,915
POWER BOOSTER SAFETY TANDEM MASTER BRAKE CYLINDER
Norman H. Hackett, Bondi, Australia, assignor of fifty percent to Roy J. Cochran, Los Angeles, Calif.
Filed Jan. 17, 1968, Ser. No. 698,669
Int. Cl. F15b 7/08
U.S. Cl. 60—54.5                              6 Claims

ABSTRACT OF THE DISCLOSURE

A device for a fluid operating system having dual outlets and arranged for sealing either outlet in the case of loss of fluid pressure therein. The device is particularly applicable to motor vehicle braking systems and includes pressure intensification means. A recharging arrangement may be provided for recharging the outlet side of the device after failure and the main operating piston is associated with a safety piston which operates in the event of failure of the main piston.

---

This invention relates to fluid braking devices incorporating pressure boosting and safety features.

The object of the invention is to provide means for a braking system which will give an indication that the braking system is malfunctioning.

A further object is to provide pressure boosting means in a safety braking system.

The present invention provides a fluid pressure device having duel outlets and incorporating fluid intensifying means and safety means in the case of absence of pressure in one of the outlets and comprising a fixed reservoir feeding a main cylinder with a main piston and a safety piston, the latter operating upon failure of the main piston, a valve piston arranged for displacement by fluid pressure developed by displacement of the main or safety piston, the valve piston being positioned in a ring valve positioned in a valve cylinder, the ring valve having a chamber in which fluid from ahead of the valve piston is passed to a first outlet and also a piston section in which fluid ahead of it is passed to a second outlet, the ring valve or the valve piston in the case of absence of fluid pressure in either of the outlets moving to operate a warning device indicating failure in the respective outlets.

The invention is hereinafter described by way of example with reference to the accompanying drawings in which:

FIGURE 1 is a cross sectional view of one embodiment of the present invention;

FIGURES 2 and 3 are cross sectional views of some of the components of FIGURE 1 in different operating positions;

FIGURE 4 is a cross sectional view of another embodiment of FIGURE 1 in a different operating position;

FIGURES 5 and 6 are cross sectional views of some of the components of FIGURE 4 in different operating positions;

FIGURE 7 is a cross sectional view of a further embodiment of FIGURE 1;

FIGURE 11 is a cross sectional view of the construction of FIGURE 7 showing the components in the recharge position.

Figure 8:
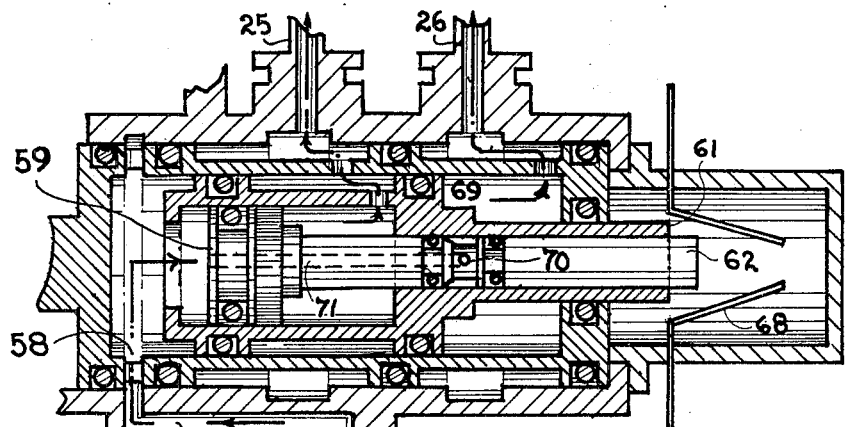
FIGURES 8, 9 and 10 are cross sectional views of some of the components of FIGURE 7 in different operating positions.

A fluid reservoir 10 is positioned on a safety master cylinder 11 having safety piston 12 arranged to reciprocate therein in response to an operating rod 13 and return spring 14. The safety cylinder 11 merges into a main cylinder 15 having a main piston 16 arranged to reciprocate therein in response to movement of the operating rod 13 which extends beyond the safety piston 12. The main piston slides in a housing 17 which is slidable in the main cylinder and is displaced by the spring 14 when it is compressed. A light return spring 18 is provided to return the housing 17. When the operating rod is moved inwards the housing is displaced to close the fluid inlet 19 into the main cylinder and fluid is compressed in the valve cylinder 20 described hereinafter.

Normally there is no fluid pressure in the safety cylinder 11 but should the main piston fail it then becomes pressurized with the rest of the system and operates the warning light switch 21. A by-pass passage 22 is provided in the main piston and this also permits the safety cylinder to be bled through a bleed valve incorporated in the switch 21.

The valve cylinder 20 contains a cylindrical slide valve 23 with a valve piston 24 slidably mounted therein. In FIGURE 1 the slide valve is shown in position with both the outlets 25 and 26 functioning normally and in FIGURES 2 and 3 the slide valve is shown in a position where the right and left hand outlets 26 and 25 respectively are not operating due to failure. When the operating rod 13 is moved inwards the fluid is compressed in the valve cylinder 20 and the valve piston 24 on its operating rod 27 is displaced against a return spring 28. This causes the port 29 to be closed by the valve piston 24 and fluid is compressed and passes through port 30 out through left hand outlet 25 and also through port 31 into the space between operating rod 27 and a valve ring 32 and through right hand outlet 26. An enlargement 33 in the bore of the cylinder 20 houses the valve ring 32.

The port 31 is located in the valve ring 32 which is arranged to close either the outlet 26 or the outlet 25 as shown in FIGURES 2 and 3 in response to unbalanced fluid pressure on either end thereof following loss of pressure in outlets 25 or 26. Because of the differential face areas on either side of piston 24 the fluid pressure on the outlet side of this piston is intensified so that the device acts as a fluid pressure intensifier as well as a safety device.

The slide valve 23 has a spring washer 34 on its outer end and the piston rod 27 has a similar washer 35 on its outer end so that the slide valve 23 cooperates with the spring 28 associated with the piston operating rod 27 and its own return spring 36.

A detent and plunger switch assembly 39 coacts with valve ring 32 to indicate when it has been displaced by failure in the system. A lever passing through a suitable gland, not shown, is provided to reset valve ring 32.

There are two enlarged shoulders 37 and 38 on the periphery of the slide valve 23 in contact with the bore of the cylinder 20 and the valve ring 32 so that two separate annular chambers are formed between these components these chambers being respectively in communication with the outlets 25 and 26.

In FIGURES 4, 5 and 6 a similar type of construction is shown except that the valve ring is replaced with a fixed valve assembly and each outlet 25 and 26 has its own shut off valve assembly described hereinafter.

The valve ring 41 is part of an end cap 42 and as soon as the piston 24 is displaced by fluid pressure port 29 is closed and fluid under high pressure passes out of port 30, through outlet port 25 and also through ports 31 and 43 to outlet port 26.

In FIGURES 5 and 6 a shut off valve 44 is positioned on outlet 25 (a similar valve is provided for outlet 26). The valve 44 has a bore housing a piston valve 45 with inlet and outlet pistons 46 and 47 the latter having a larger effective area and both having their outside faces vented to atmosphere. In FIGURE 5 the piston valve 45 is shown under failure conditions in the outlet port 48 and in FIGURE 6 the piston is shown in a position where there is pressure in the outlet 48 in which case oil flows around the space between the reduced diameter portion 45 through outlet 48. An indicating switch 49 is shown in association with the piston 46 and in FIGURE 5 it is shown in contact with the piston 46.

In FIGURE 7 a resetting device is incorporated which permits the operating pistons to be recharged by a lever or resetting rod positioned adjacent the operating rod. Components 10–17, 19, 21 and 22 correspond to those described in FIGURES 1 to 6. The piston 17 is backed by a return spring 50 housed in an extension 51 having a port 52 in communication with a valve cylinder 53 which forms an extension of the reservoir 10.

Figure 9:
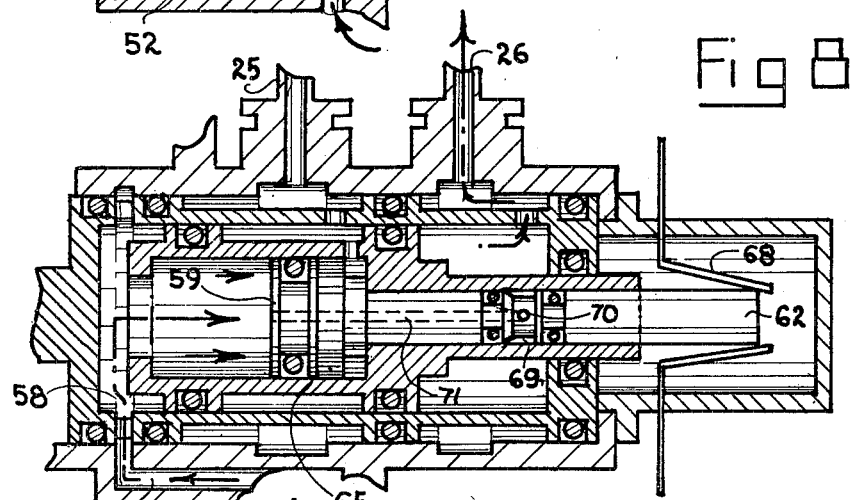
Figure 10:
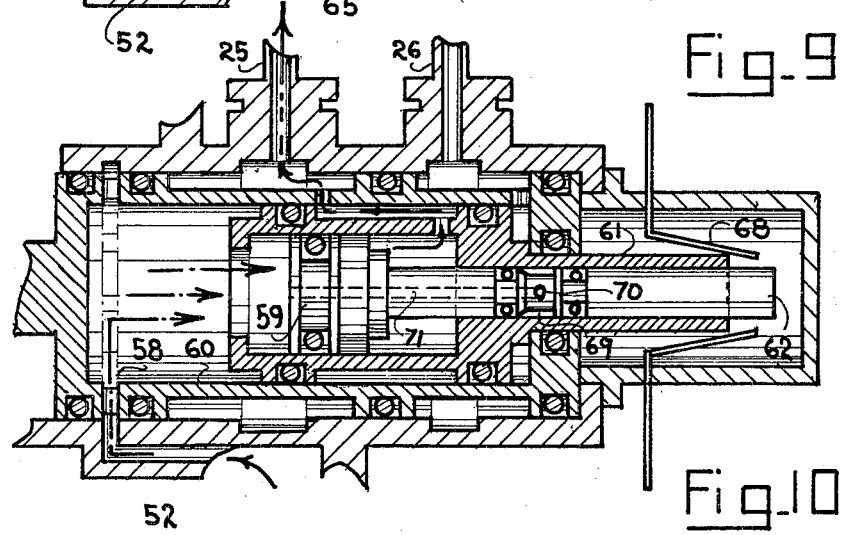

In FIGURES 8, 9 and 10 the valve cylinder assembly is shown in the operating left hand outlet failure and right hand outlet failure positions respectively. In FIGURE 7 the assembly is shown in the standby or bleed position.

A ring valve 54 which has an end cap 55 with rearwardly directed reset rod 56 passing through the reservoir 10. When resetting the valve ring 54 is displaced against its control spring 57.

In FIGURE 8 the fluid flow is through passageway 52 to port 58 to the rear face of piston 59 which is slidably positioned in the bore of slide valve 60 and this has a tubular extension 61 which acts as a guide for piston rod 62. Pressure acting on the piston 60 and the end flange 63 of slide valve 60 causes both of these components to move away from the reservoir 10 and fluid ahead of the piston passes through ports 64 and 65 into outlet 25. The reduced diameter portion 66 of slide valve 60 acts as a piston to compress fluid ahead of it which passes out through port 67 into outlet 26. In the absence of pressure at outlets 25 and 26 tabular extension 61 and piston rod 62 move forward and contact switch elements 68 as shown in FIGURES 9 and 10 respectively.

In FIGURE 11 the components in FIGURES 7 to 10 are shown in the recharging position. Operating rod 56 is withdrawn upon indication of failure conditions as shown in FIGURES 9 and 10 and fluid flow consequent upon displacement of ring valve 54 passes through ports 65 and 64 to the front face of piston 59 returning it to its original position and venting oil out through port 58 which is in the form of a series of holes around the periphery of ring valve 54. Similarly oil flow can pass through ports 67 from ahead of reduced diameter portion 66 of slide valve 60 and if necessary through ports 64 and 65 into the space ahead of piston 59. The piston rod 62 has a reduced diameter portion 69 having a transverse hole 70 communicating with an axial bore 71 extending to the reservoir end of the piston 59 so that when the operating rod 56 and the piston 59 are fully retracted the hole 70 is on the reservoir side of reduced diameter portion 66 and fluid between it and the piston can return to the reservoir.

In FIGURE 11 the housing 17 has been displaced forwards so that the main piston 16 enters extension 53 and the inlet 19 is shut off from the main cylinder 11.

What is claimed is:

1. A fluid pressure device comprising a master brake cylinder having a body portion provided with fluid pressure intensifying means and dual pressurized fluid outlet means for continuously maintaining fluid pressure in at least one of at least a pair of pressure intensified fluid outlets, a main cylinder provided with a first main piston and a second safety piston, said second piston operating upon failure of the main piston, a valve piston in said body and arranged for displacement by fluid pressure developed by displacement of the main or safety piston, the valve piston being positioned in a ring valve positioned in a valve cylinder, the ring valve having a chamber in which fluid from ahead of the valve piston is passed to a first outlet and also a piston section in which fluid ahead of it is passed to a second outlet, whereby the ring valve or the valve piston in the case of absence of fluid pressure in either of the outlets moving to operate a warning device indicating failure in the respective outlets.

2. The combination as claimed in claim 1 including a pressure responsive valve in association with each outlet and including a piston valve slidable in a cylinder, the fluid entering the valve between the opposed piston faces of the piston valve, the face on the outlet side being stepped and larger than the face on the inlet side so that in the absence of fluid pressure on the outlet side the piston valve is displaced so that the stepped portion on the outlet side seals the outlet.

3. The combination as claimed in claim 1 including a slide valve positioned in the valve cylinder and having opposed pressure responsive faces for sealing either of the fluid outlets in the absence of pressure therein.

4. The combination as claimed in claim 1 in which the main piston slides in a housing in the main cylinder and operation of the main piston and safety piston causes the housing to be displaced to shut off oil flow from the reservoir to the space ahead of the safety piston upon failure of the main piston.

5. The combination as claimed in claim 4 including switch means associated with the housing for indicating displacement of it and failure of the main piston.

6. The combination as claimed in claim 1 in which the slide valve is mounted in a valve cylinder and in which the space behind the valve piston is in communication with the reservoir and in the absence of pressure in either of the outlets recharge operating rod upon displacement causes the slide valve to be displaced backwards against its normal displacement by fluid pressure from the main cylinder, the slide valve having ports which in the recharge position permit fluid on the inlet side of the valve piston to be vented into the reservoir and in such position fluid from the main cylinder acting on the outlet side of the valve cylinders to urge it towards the inlet end of the slide valve and a passageway in the piston rod of the valve piston for permitting fluid in the recharge position to pass from the outlet side of the valve piston to the inlet side of the valve piston.

References Cited

UNITED STATES PATENTS 3,140,587   7/1964   Stelzer.
3,393,514   7/1968   Cripe.
3,416,315   12/1968   Wortz.

MARTIN P. SCHWADRON, Primary Examiner

R. R. BUNEVICH, Assistant Examiner